United States Patent [19]
Johnson

[11] 3,708,114
[45] Jan. 2, 1973

[54] TV CHANNEL INDICATOR COUNTER

[75] Inventor: Arnold C. Johnson, West Hartford, Conn.

[73] Assignee: Veeder Industries Inc., Hartford, Conn.

[22] Filed: March 17, 1972

[21] Appl. No.: 235,681

[52] U.S. Cl. ................235/103, 116/124.1, 235/1 A, 235/117 A, 235/139 A
[51] Int. Cl. .....G06m 1/14, G06c 27/00, G06m 1/22
[58] Field of Search ......235/103, 117, 117 A, 139 A, 235/1 A; 116/124.1; 74/10.22, 10.8

[56] References Cited

UNITED STATES PATENTS

| | | | |
|---|---|---|---|
| 1,439,097 | 12/1922 | Graham | 235/117 R |
| 1,692,489 | 11/1928 | Dinsmore | 235/139 A |
| 3,432,096 | 3/1969 | Powell | 235/139 A |
| 3,452,927 | 6/1969 | Bies et al. | 235/117 R |
| 3,618,852 | 11/1971 | Kes et al. | 235/117 R X |

*Primary Examiner*—Richard B. Wilkinson
*Assistant Examiner*—Stanley A. Wal
*Attorney*—John M. Prutzman et al.

[57] ABSTRACT

A TV channel indicator counter comprising a pair of coaxial molded plastic counter wheels mounted on a counter wheel shaft and a multi-purpose molded plastic part mounted on the shaft intermediate the counter wheels having an H-shaped partially cylindrical mask overlying the numeral bearing rims of the counter wheels and defining a pair of axially spaced windows for reading the counter wheels and for masking the adjacent surfaces of the wheel rims and the space between the wheels.

7 Claims, 3 Drawing Figures

TV CHANNEL INDICATOR COUNTER

BRIEF SUMMARY OF THE INVENTION

The present invention relates generally to counters and more specifically to a counter having notable utility in television receivers for connection to the usual station tuner for indicating the channel to which the TV is tuned.

It is a principal aim of the present invention to provide a new and improved TV channel indicator counter having an economical construction with a minimum number of parts facilitating mass production at a low unit cost.

It is another aim of the present invention to provide a new and improved TV channel indicator counter which can be easily read under all lighting conditions.

Other objects of the present invention will be in part obvious and in part pointed out more in detail hereinafter.

A better understanding of the invention will be obtained from the following detailed description and the accompanying drawing of an illustrative application of the invention.

DESCRIPTION OF THE PREFERRED EMBODIMENT

Figure 1:
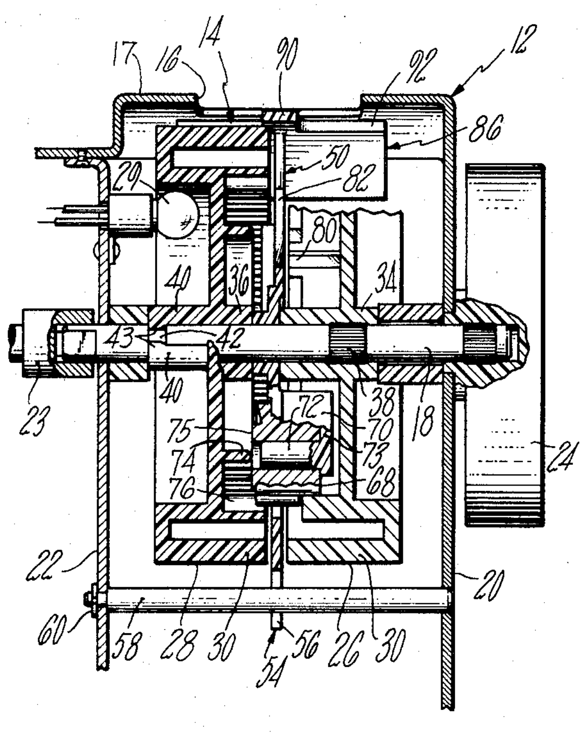
FIG. 1 is an axial section view, partly broken away and partly in section, showing a TV channel indicator counter installation incorporating an embodiment of the present invention.
Figure 2:
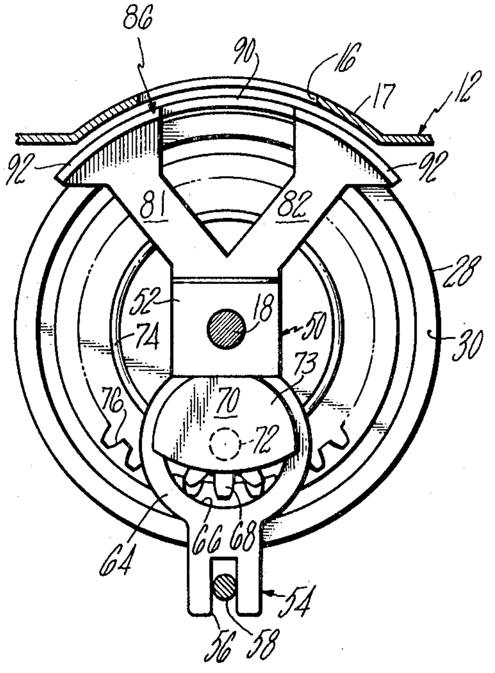
FIG. 2 is a transverse section view, partly broken away and partly in section, of the counter installation.

Referring now to the drawing in detail wherein like numerals represent like parts throughout the several figures, a television receiver channel indicator counter installation incorporating an embodiment of the present invention is shown comprising a counter housing 12 which may be formed from the usual television receiver chassis and a TV channel indicator counter 14 mounted within the housing 12 and readable through an opening or window 16 in a convex partially cylindrical section 17 of the housing 12.

The channel indicator counter 14 has a drive shaft 18 rotatably supported within apertures in a housing side wall 20 and an inner parallel support plate 22 suitably mounted within the housing 12. The inner end of the counter shaft 18 projecting through the support plate 22 is suitably connected by a coupling 23 to a TV station tuner (not shown). A station selector knob 24 is press fit onto an outer end of the shaft 18 projecting beyond the housing sidewall 20 for operating the TV tuner.

A pair of one piece molded plastic indicator wheels 26, 28 of relatively lower and higher order respectively are mounted on the shaft 18. The wheels 26, 28 have cylindrical coaxial rims 30 of the same diameter and axial width. Each wheel rim bears a 0–9 indicia sequence on its peripheral cylindrical surface and with an equiangular centerline spacing of 36° between indicia. The indicia are preferably provided by masking or coating the remaining portion of the peripheral cylindrical surface of each indicator wheel rim with a suitable opaque black coating material. The wheels 26, 28 are preferably formed of a contrasting milky translucent plastic to facilitate reading the indicator wheels in day light. To facilitate reading the indicator wheels under reduced lighting, backlighting is provided by an incandescent bulb 29 which is preferably connected to be turned on when the TV receiver is turned on.

Figure 3:
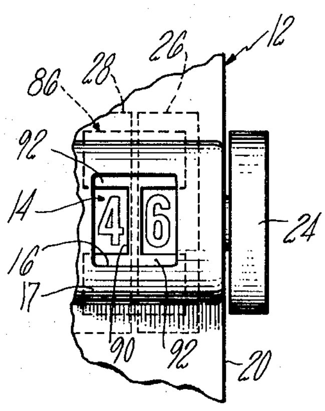
FIG. 3 is a reduced front view, partly broken away, of the counter installation.

As shown in FIG. 3, the wheel indicia have a width less than one-half the width of the rims 30 and the indicia on each wheel are positioned off center on the rim axially inwardly toward the other wheel and such that a substantial approximately one-half outer axial portion of the rim is completely black. Such outer axial portion of each wheel cooperates with the housing convex closely overlapping section 17 to provide an effective light mask at the outer axial edge of each wheel.

The counter wheels 26,28 have axially spaced central hubs 34, 36 respectively for supporting the counter wheels on the shaft 18, and the shaft 18 has a knurled section 38 for securing the lower order counter wheel 26 to the shaft. The higher order counter wheel 28 is rotatably mounted on the shaft 18, and three angularly spaced axially extending radially resilient fingers 40 are formed on the outer end of the wheel hub 36 for receipt in part within a peripheral groove 42 in the shaft 18. The fingers 40 are sufficiently resilient to permit inserting the wheel 38 onto the shaft and for holding the wheel in appropriate position on the shaft with the inner radial projections 43 of the resilient fingers received within the groove 42.

A multi-purpose one piece molded plastic part 50 is mounted intermediate the wheels 26, 28. The molded part 50 has a central rectangular hub portion 52 freely supporting the part 50 on the shaft and a first radially extending arm 54 with a slotted or bifurcated end 56 extending beyond the perimeter of the wheel rims 30 and receiving a suitable anchoring pin 58 for anchoring the part 50 against rotation on the shaft 18. The anchoring pin 58 is shown mounted within openings in the housing side wall 20 and support wall 22 and is suitably secured in place, as for example by a snap ring 60 on the reduced inner end of the anchoring pin. An intermediate generally circular section 64 of the radial arm 54 has a circular opening 66 for receiving a molded plastic mutilated transfer pinion 68 and a cup portion 70 with an inwardly axially extending stub shaft 72 coaxial with the opening 66 for rotatably supporting the transfer pinion 68. A pocket is thereby formed for supporting the transfer pinion 68 for interconnecting the counter wheels 26, 28. The transfer pinion is axially retained in position by a flat base portion 73 of the cup portion 70 and by a circular axially inwardly extending flange 74 of the higher order counter wheel 28. An inner axial hub 75 of the pinion 68 engages the flange 74 for retaining the pinion in appropriate position and the pinion teeth are formed to prevent interference by the retaining flange 74 with rotation of the pinion.

A 360° internal gear 76 is provided by axially inwardly extending flange of the higher order counter wheel 28 and a combined locking ring and two tooth gear segment 80 is provided by an axially inwardly extending flange of the lower order counter wheel 26.

The transfer pinion 68 is mounted in operative engagement with the internal gear 76 and combined locking gear and two tooth transfer segment 80 such that in a conventional manner the transfer pinion 68 is rotated for indexing the higher order counter wheel 28 one count or 36° for each full revolution of the lower order counter wheel 26. Thus, the pair of counter wheels 26, 28 provide for registering any count from 00 to 99. The counter shaft can, of course, be rotated in either direction by the knob 24 to set the TV tuner, and, of course, the counter shaft 18 is connected to the TV tuner such that the counter continually registers the station at which the tuner is set.

The molded part 50 has a pair of radially extending arms 81, 82 providing a generally V-shaped support diametrically opposite the radial arm 54 and a generally H-shaped mask 86 supported on the arms 81, 82. The H-shaped mask 86 is partially cylindrical and mounted in closely spaced overlying coaxial relationship with the wheel rims 30. The H-shaped mask 86 consists of a central circumferentially extending relatively narrow band 90 overlying the inner axial edges of both wheel rims 30 without however overlying the wheel indicia to provide for masking the edges of the wheel rims and the space between the wheel rims. A pair of relatively wide circumferentially spaced and axially extending bands 92 of the mask provide for defining with the center band 90 a pair of axially spaced windows for reading the numeral wheels 26, 28 and for masking the adjacent numeral bearing surfaces of the wheels. The mask 86, and therefore the entire molded part 50, is preferably formed of opaque black plastic to form with the black coating on the wheel rims 30 a continuous black background for facilitating reading the wheel indicia.

As will be apparent to persons skilled in the art, various modifications, adaptations and variations of the foregoing specific disclosure can be made without departing from the teachings of the present invention.

I claim:

1. An indicator counter comprising a counter shaft, a pair of relatively lower and higher order counter wheels mounted on the shaft in close axially spaced relationship, the counter wheels having coaxial cylindrical rims of the same diameter each bearing equiangularly spaced indicia therearound, a multi-purpose single piece molded plastic part having a hub freely supported on the shaft intermediate the counter wheels, an inwardly axially extending stub shaft radially inwardly of the wheel rims, a radial end portion radially outwardly of the wheel rims for anchoring said multipurpose part against rotation on the shaft, and an H-shaped partially cylindrical mask closely overlying and coaxial with the wheel rims, the H-shaped mask comprising a relatively narrow circumferentially extending center band portion extending between and overlying the inner circumferential edges of the wheel rims and a pair of axially extending circumferentially spaced band portions defining with the center band a pair of axially spaced windows for reading the counter wheels, and a mutilated transfer pinion rotatably mounted on the stub shaft, the lower order counter wheel having an internal combined locking ring and transfer gear sector in operative engagement with the transfer pinion and the higher order counter wheel having an internal gear in operative engagement with the transfer pinion for indexing the higher order counter wheel one count for each full revolution of the lower order counter wheel.

2. An indicator counter according to claim 1 wherein the higher order counter wheel has a circular axially inwardly extending flange in substantial axial alignment with said stub shaft and engageable with an inner axial end of the transfer pinion for retaining the pinion on the stub shaft in operative engagement with both said combined locking ring and transfer gear sector and said internal gear.

3. An indicator counter according to claim 1 wherein the lower order counter wheel is secured to the shaft for being rotated thereby and the higher order counter wheel is rotatably mounted on the shaft, and wherein the shaft has a circular groove and the higher order counter wheel has at least one axially extending radially resilient finger received in part within the groove of the shaft for retaining the higher order counter wheel against axial displacement on the shaft and adapted to be radially outwardly deflected to permit the higher order counter wheel to be axially assembled onto the shaft.

4. An indicator counter according to claim 1 wherein the multi-purpose single piece molded plastic part has a first radially extending arm providing said stub shaft and said radial end portion and has a pair of second radially extending arms providing a generally V-shaped support generally diametrically opposite the first radially extending arm for the H-shaped mask.

5. An indicator counter according to claim 1 wherein the indicia on each wheel rim are offset axially inwardly from the rim centerline to provide an axially outwardly rim portion for assisting in masking the outer edges of the wheel rims.

6. An indicator counter according to claim 1 wherein said multi-purpose part is constructed of black plastic, wherein the pair of counter wheels are constructed of translucent milky plastic, wherein the indicia are provided on the wheel rims by a black background coating on the rims defining the indicia, and wherein the indicator counter comprises backlighting for lighting the wheel indicia by the transmission of light through the wheel rims.

7. A TV station indicator counter for use with a TV station tuner for indicating the station to which the TV receiver is tuned, comprising a counter shaft, two relatively lower and higher order counter wheels mounted on the shaft in close axially spaced proximity, the lower order counter wheel being secured to the shaft for being rotated thereby and the higher order counter wheel being rotatably mounted on the shaft, the counter wheels having coaxial cylindrical rims of the same diameter each bearing a sequence of equiangularly spaced indicia of 0–9 therearound, a multi-purpose single piece molded plastic part having a hub freely supported on the shaft intermediate the counter wheels, a radial arm with an axially inwardly extending stub shaft radially inwardly of the wheel rims and an end portion radially outwardly of the wheel rims for anchoring said multi-purpose part against rotation on the counter shaft, an H-shaped partially cylindrical mask coaxial with and closely overlying the wheel rims, and a radially extending support for the H-shaped mask, the H-shaped mask having a circumferentially extending center band portion extending between the wheel rims and overlying the inner edges thereof, and a pair of axially extending circumferentially spaced band portions at the ends of the center band defining therewith a pair of axially spaced windows for reading the counter wheel indicia and for masking the adjacent portions of the wheel rims, and a mutilated transfer pinion rotatably mounted on the stub shaft, the lower counter wheel having a combined locking ring and transfer gear sector operatively engaging the transfer pinion and the higher order counter wheel having a gear operatively engaging the transfer pinion for indexing the higher order counter wheel one count for each full revolution of the lower order counter wheel.

* * * * *